June 30, 1970        D. R. DE BOISBLANC        3,518,163
SODIUM-COOLED FAST-FLUX TEST REACTOR
Filed April 4, 1968        3 Sheets-Sheet 1
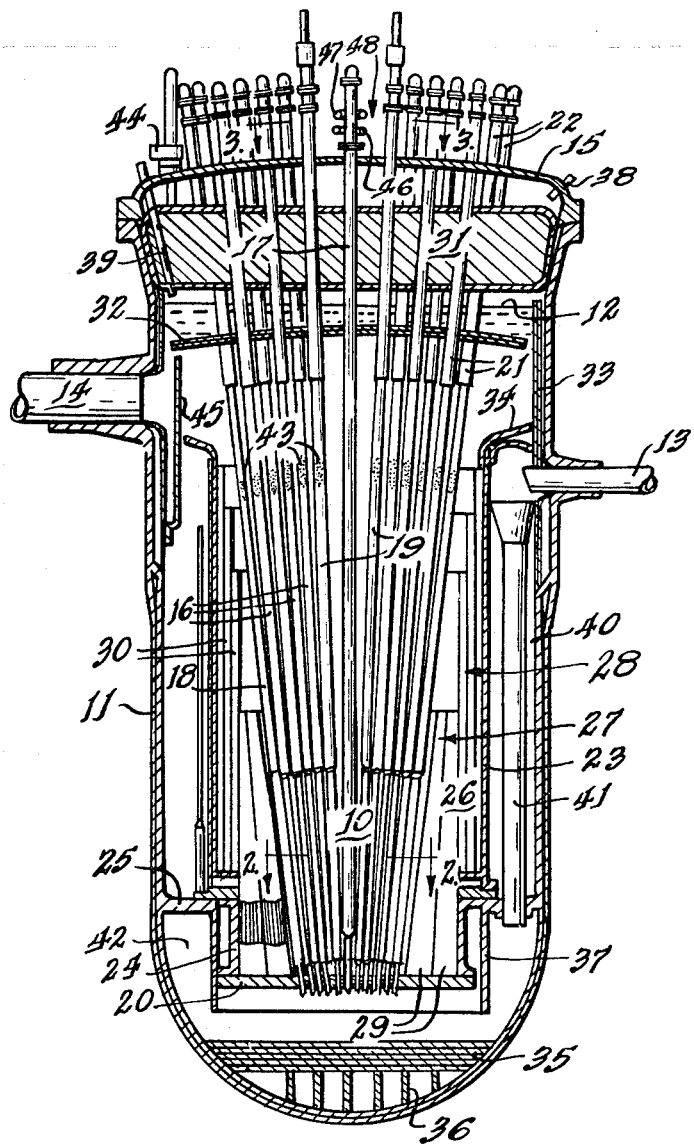
Inventor
Deslonde R. deBoisblanc
Roland A. Anderson
Attorney

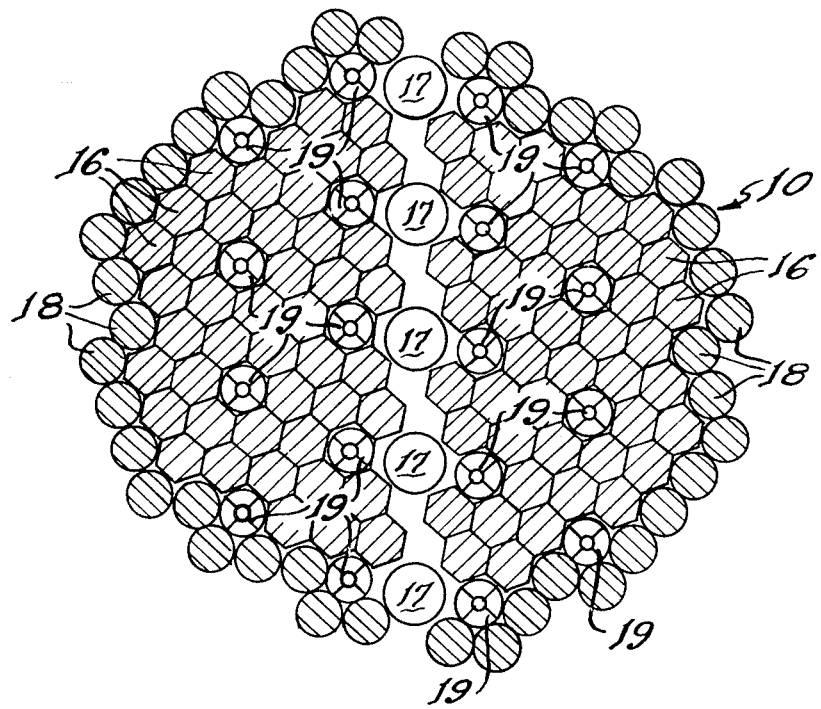
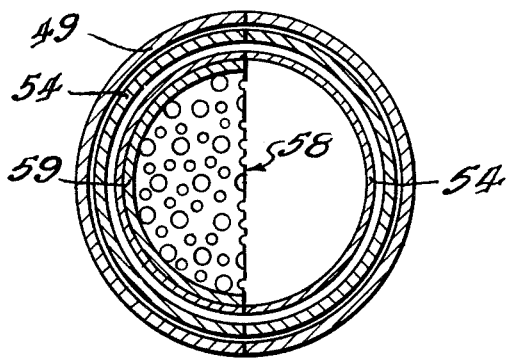
Legend
- Fuel Positions
- Control Positions
- Reflector Positions
- Closed Loops

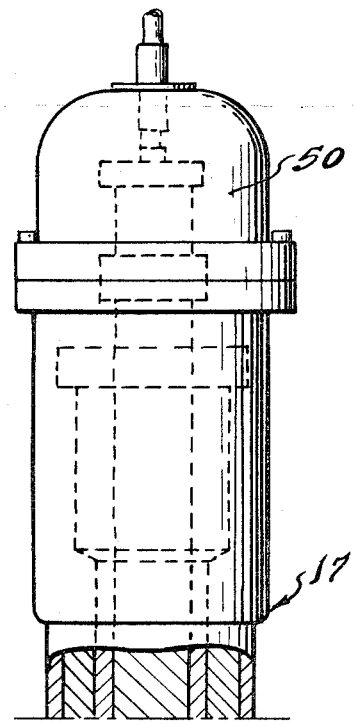

United States Patent Office 3,518,163
Patented June 30, 1970

3,518,163
SODIUM-COOLED FAST-FLUX TEST REACTOR
Deslonde R. de Boisblanc, Idaho Falls, Idaho, assignor to the United States of America as represented by the United States Atomic Energy Commission
Filed Apr. 4, 1968, Ser. No. 718,685
Int. Cl. G21c 1/02
U.S. Cl. 176—40   2 Claims

ABSTRACT OF THE DISCLOSURE

A sodium-cooled fast-flux test reactor including a core consisting of an array of hexagonal fuel tubes tilted to conform to a split truncated cone. A plurality of vertical closed test loops are arranged in a vertical plane bisecting the conical reactor core.

CONTRACTUAL ORIGIN OF THE INVENTION

The invention described herein was made in the course of, or under, a contract with the United States Atomic Energy Commission.

BACKGROUND OF THE INVENTION

This invention relates to a nuclear reactor and more particularly to a reactor designed to provide a fast neutron environment for testing fuels, materials and components for fast breeder reactors. The invention specifically relates to a test reactor including a core designed to provide maximum vertical closed-loop volume without excessive penalty to core flux-power ratio.

Development of liquid-meal-cooled fast-breeder reactors to the stage wherein commercial operation thereof is practicable is one of the major objectives of the atomic energy program of the United States. It has long been recognized that a new facility for testing fuels and materials in support of this program is required. Broad goals for the testing capability of such a facility may be summarized as follows:

(1) The facility must accommodate a wide range of test objects in terms of number, size and physical characteristics.

(2) It must be possible to control the environmental conditions of the tests.

(3) It must be possible to monitor the environment and the test objects to provide data for determination of cause and effect relationships established by the tests.

The reactor should also incorporate a plurality of vertical closed test loops, since it is only in such loops that the conditions in reactors expected to be used conventionally in the future can be accurately reproduced. It is also necessary to provide for fueling and test loop access and piping connections at the top of the reactor while maintaining a compact core to provide the desired high flux.

The reactor design described herein is an improvement on Pat. No. 3,212,982, issued Oct. 19, 1965 to Eugene R. Astley et al., which describes a reactor satisfying the broad goals mentioned above but provides space for only one vertical loop—at the center of the reactor core—all other loops being inclined at an angle to the vertical. Since inclined loops are not readily subject to analysis nor are gravity effects in such loops identical to those in vertical fuel channels, the design would not be completely satisfactory for the purpose intended.

It is accordingly an object of the present invention to develop a fast reactor including ample space for testing fast reactor components and incorporating a compact core and an open array of fuel tubes at the top cover.

It is a more specific object of the present invention to develop a Fast-Flux Test Reactor incorporating a plurality of vertical, closed test loops.

These and other objects of the present invention are attained in a sodium-cooled, fast-flux test reactor including a core consisting of an array of hexagonal fuel tubes tilted to conform to a split truncated cone. A plurality of vertical test loops are arranged in a vertical plane bisecting the truncated cone. This configuration may be more simply described as comprising the intersection of a slab containing the closed test loops with a cone containing the fuel tubes.

It should be noted that such an arrangement is only useful in a fast reactor. It is not attractive in a thermal reactor because the power distribution in the core region would be very poor. The reactivity loss due to the spreading of the core, the increased power peaks in between fuel elements, increased parasitic capture of neutrons in nonfueled regions, all would make this a very poor arrangement. In a fast reactor, on the other hand, only small flux depression effects exist and the loss in flux is nearly independent of the geometry and dependent principally on the percentage volume displaced by the experimental region. The leakage of neutrons is greater in the upper region than the lower region of the fast core, but this has a very small effect upon the flux distribution. All these effects in the fast reactor are tolerable because of the small amount of light nucleus scattering compared to that found in a thermal reactor.

BRIEF DESCRIPTION OF THE DRAWINGS

The invention will next be described in connection with the accompanying drawings wherein:

FIG. 1 is a vertical sectional view of a nuclear reactor according to the present invention.

FIG. 2 is a horizontal sectional view taken on the line 2—2 in FIG. 1 and showing only an outline of the arrangement of fuel positions, control positions, reflector positions and closed test loops in the core of the reactor.

FIG. 3 is a vertical elevation, taken partly in section, of the top portion of a closed test loop.

FIG. 4 is a vertical sectional view of the middle portion of said closed test loop.

FIG. 5 is a vertical sectional view of the lower portion of said closed test loop.

FIG. 6 is a horizontal sectional view taken on the line 6—6 in FIG. 4.

DESCRIPTION OF THE PREFERRED EMBODIMENT

Referring now to FIG. 1 of the drawings, the reactor comprises a core 10 disposed in the lower portion of a double-walled, stainless steel, cylindrical pressure vessel 11 which is filled with sodium to level 12 and is provided with four inlet nozzles 13 and four outlet nozzles 14 which serve four parallel primary coolant loops, as well as a top cover 15.

Core 10 comprises a plurality of fuel subassemblies (not shown) arranged in a hexagonal pattern and disposed in hexagonal fuel tubes 16 which are inclined in conical array and—although this is not shown in the drawing—taper slightly from top to bottom below the bottom of the core. Fuel tubes 16 are split along one diameter by five vertical closed test loops 17 which are 6 inches in diameter and 8½ inches apart and accommodate test experiments up to 4 inches in diameter. The total volume of this central gap is 150 liters. The fuel in fuel tubes 16 will be called "driver" fuel hereinafter to distinguish it from the fuel present in test loops 17. Core 10 is about 34 inches in length with an equivalent diameter of about 42.5 inches and maximum flux at a core power of 400 mw. is about $0.7 \times 10^{16}$ n./cm.$^2$/sec.

With the conical array the core packing efficiency is limited due to the dispersion of subassemblies as the core is traversed from bottom to top. For an optimized design the gap between fuel tubes amounts to one-half inch at the core top with contact occurring at the bottom of the core.

Surrounding fuel tubes 16 are a plurality of reflector tubes 18 containing reflector assemblies (not shown) formed of a high-nickel alloy. Interspersed among fuel tubes 16 and reflector tubes 18 are a plurality of control tubes 19 in which control assemblies (not shown) containing $B_4C$ operate. The fuel, reflector and control assemblies will not be described further except to mention that the fuel is a mixture of uranium and plutonium dioxides formed into rods which are clad in stainless steel, since details are not important to the present invention.

Fuel tubes 16 are supported and restrained by a bottom tube sheet 20 and by guide tubes 21 which are extensions of cover nozzles 22 which penetrate and are attached to top cover 15. Bottom tube sheet 20 is supported from a cylindrical inner vessel 23 by annular member 24. In turn, inner vessel 23 is supported from pressure vessel 11 by ledge 25.

Immediately surrounding core 10 is stationary radial reflector 26 which includes an inner assembly 27 immediately surrounding core 10 and an outer assembly 28 which extends from near the midplane of the core to a point substantially above the top of the core. Inner assembly 27 consists of two wedge-shaped segments 29 filled with rods of a nickel-base alloy and serves as a transition portion between the conical geometry of the core and the cylindrical geometry of the pressure vessel. Outer assembly 28, in turn, consists of several concentric cylinders 30 of a nickel-base alloy.

It will be noted that this reactor includes a reflector rather than a breeder blanket as is common in fast reactors. This provides maximum core flux for a given power density.

Other details shown in FIG. 1 include a top shield 31 located just below top cover 15 and a curved stainless steel plate 32 located just below top shield 31, an annular vertical plate 33 located in the peripheral portion of the pressure vessel and a conical plate 34 located just above inlet nozzles 13, all of which serve as thermal barriers. Also shown is a melt-down device 35 supported by grid 36 at the bottom of the pressure vessel, an annular inlet vortex baffle 37 surrounding the sheet 20 and depending from ledge 25, and a gas coolant inlet 38 and outlet 39 for the pressure vessel labyrinth seal.

The primary coolant system will next be described. Sodium enters pressure vessel 11 through inlet nozzles 13 at 700° F. and then flows from annular plenum 40 through vertical inlet pipes 41 to lower inlet plenum 42. Sodium then passes under baffle 37 before flowing upwardly through the fuel assemblies, control assemblies, and reflector assemblies, leaving tubes 16, 18 and 19 through apertures 43. Sodium leaves the pressure vessel through outlet nozzles 14 at 1400° F. Any of the outlet nozzles can be isolated from the system by actuating mechanism 44 to close slide gate 45.

As shown at the top of FIG. 1, an inlet pipe 46 and an outlet pipe 47 for each closed test loop 17 is disposed in a chaseway 48 located just above reactor cover 15. Sufficient room for these pipes is available due to the inclination of the tubes 16, 18 and 19 and each closed test loop 17 may be removed without removing the loop piping. Some of the inlet and outlet pipes 46 and 47 approach the test loops from one side of the reactor and some from the other and some from one side of the loops and some from the other.

Referring next to FIGS. 3 through 5, each closed test loop 17 includes a process tube 49, provided with a closure 50, which is guided within the reactor by a sleeve 51. Process tube 49 includes an elongated extension 52 bearing a wear pad 53 designed to prevent galling of the process tube by the tube sheet 20.

Inlet and outlet pipes 46 and 47 are located near the top of the test loop above the reactor cover 15. Process tube 49 contains a pressure tube 54 concentric therewith and spaced therefrom and sealed to the process tube just below inlet pipe 46 and near the bottom of the loop. The annulus formed thereby is filled with helium and serves as a thermal barrier to prevent excessive thermal stress on the process tube.

Process tube 49 also contains a flow tube 55 concentric therewith and spaced from pressure tube 54 and connected to process tube 49 at its top intermediate of inlet pipe 46 and outlet pipe 47. Inlet pipe 46 penetrates process tube 49 and delivers sodium to the exterior of flow tube 55. Since flow tube 55 is open at the bottom and is not connected to the process tube, sodium flows downwardly along the outside of flow tube 55 and then upwardly on the inside of the tube. Process tube 49, pressure tube 54 and flow tube 55 are all carried from top closure 50 by a support tube 56 having cooling fins 57 thereon above the sodium level in the process tube.

Closed loop experiment 58 fits inside flow tube 55 and hangs from top closure 50 on experiment hanger rod 59 which also has cooling fins 60 thereon above the sodium level in the process tube. This experiment may be, for example, a proposed fuel assembly for a new reactor. Sodium passing upwardly through flow tube 55 serves as coolant for experiment 58 prior to leaving the loop by outlet pipe 47 and helium is circulated in the test loop above the sodium level therein by means not shown. Up to 6 mw. of power may be developed in each of test loops 17 and thus an appreciable proportion of the power developed by the reactor will be developed in the test loops.

As shown in FIG. 2, the reactor core contains five (5) closed test loops 17, eight-eight (88) fuel tubes 16, forty-two (42) reflector tubes 18, and eighteen (18) control tubes hexagonally distributed with lattice spacing of about 4.3 inches. As it is not necessary to include driver fuel in all of the fuel tubes to maintain design power, certain of these tubes may be employed as open test loops or for other experimental facilities. The eighteen control assemblies include eight (8) shim rods in the reflector, six (6) shim rods in the core and four (4) safety rods in the core. Although a specific arrangement of fuel, reflector and control positions is shown, it will be appreciated that the arrangement can be varied and that tests in open test loops may be located interchangeably with driver fuel assemblies in any of the core positions.

It will be understood that the invention is not to be limited to the details given herein but that it may be modified within the scope of the appended claims.

The embodiments of the invention in which an exclusive property or privilege is claimed are defined as follows:

1. A liquid-metal-cooled fast-flux test reactor comprising a core consisting of a hexagonal array of fuel tubes, tilted to form a truncated cone, said fuel tubes containing a nuclear fuel, and a plurality of vertical closed test loops disposed in a vertical plane bisecting the reactor core.

2. A test reactor according to claim 1 containing five vertical test loops wherein the core consists of 88 hexagonal fuel tubes, 18 control tubes arranged in two rows of five each adjacent the test loops and two rows of four each away from the test loops and 42 reflector tubes surrounding the fuel tubes.

References Cited

UNITED STATES PATENTS 3,212,982  10/1965  Astley et al. _____ 176—40

REUBEN EPSTEIN, Primary Examiner

U.S. Cl. X.R.

176—18